Jan. 2, 1951 E. R. HANSEN 2,536,175
CUTOFF ATTACHMENT FOR CHUCKING MACHINES
Filed Oct. 3, 1946 4 Sheets-Sheet 1

INVENTOR.
Edward R. Hansen
BY
Zabel and Gritzbaugh
Attys.

Jan. 2, 1951 E. R. HANSEN 2,536,175
CUTOFF ATTACHMENT FOR CHUCKING MACHINES
Filed Oct. 3, 1946 4 Sheets-Sheet 2
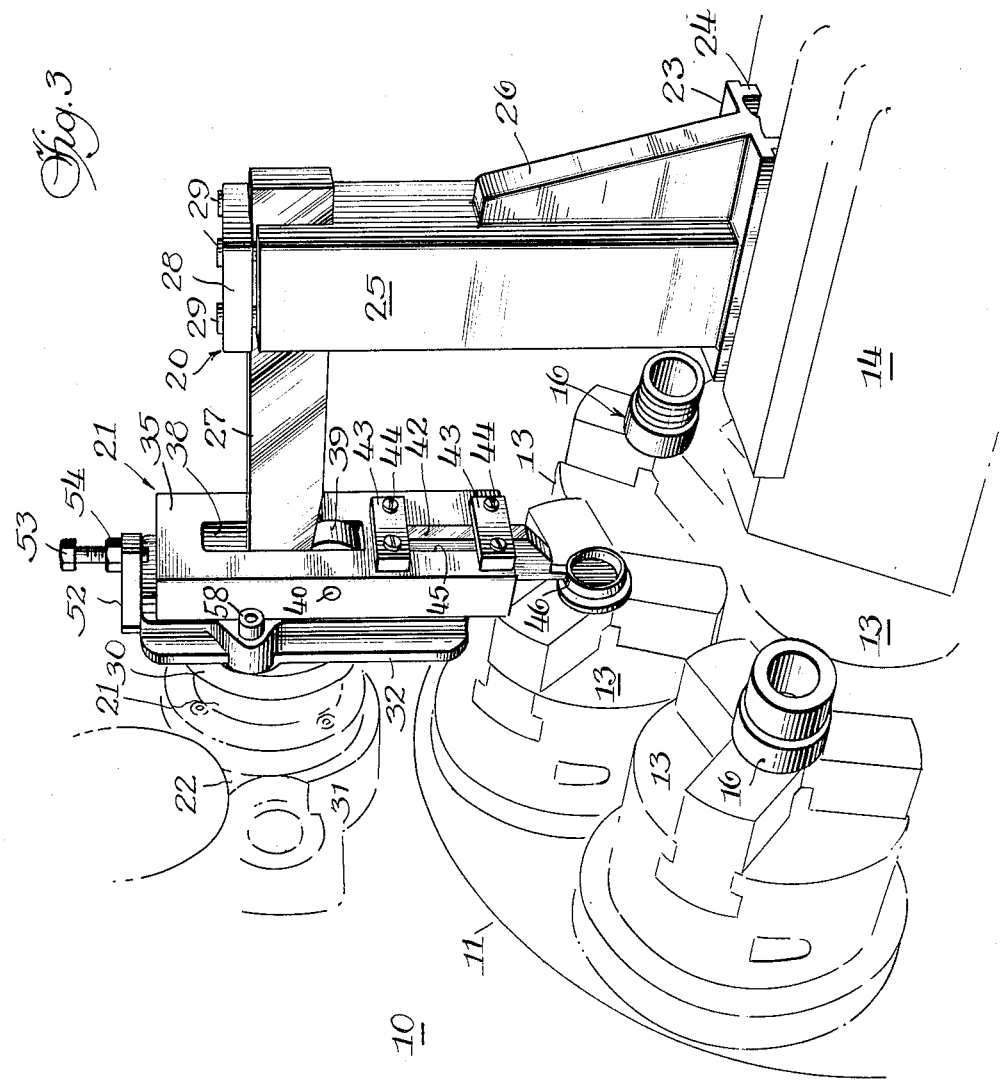
INVENTOR.
Edward R. Hansen,
BY
Zabel and Gritzbaugh
Attys.

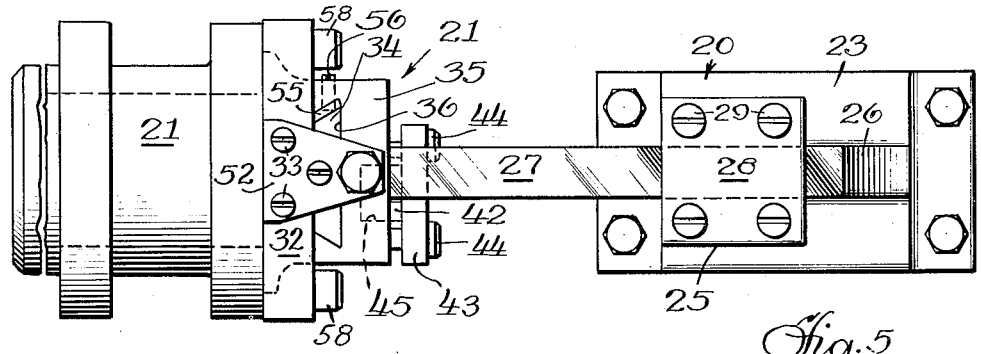
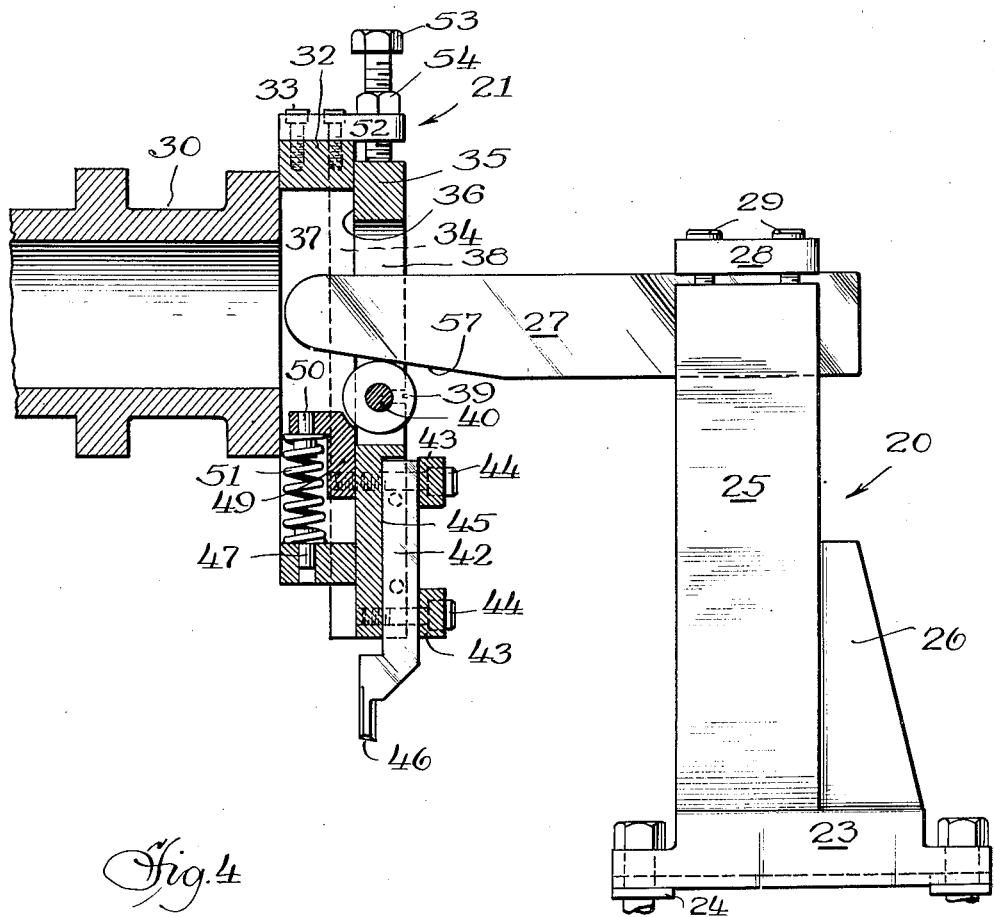

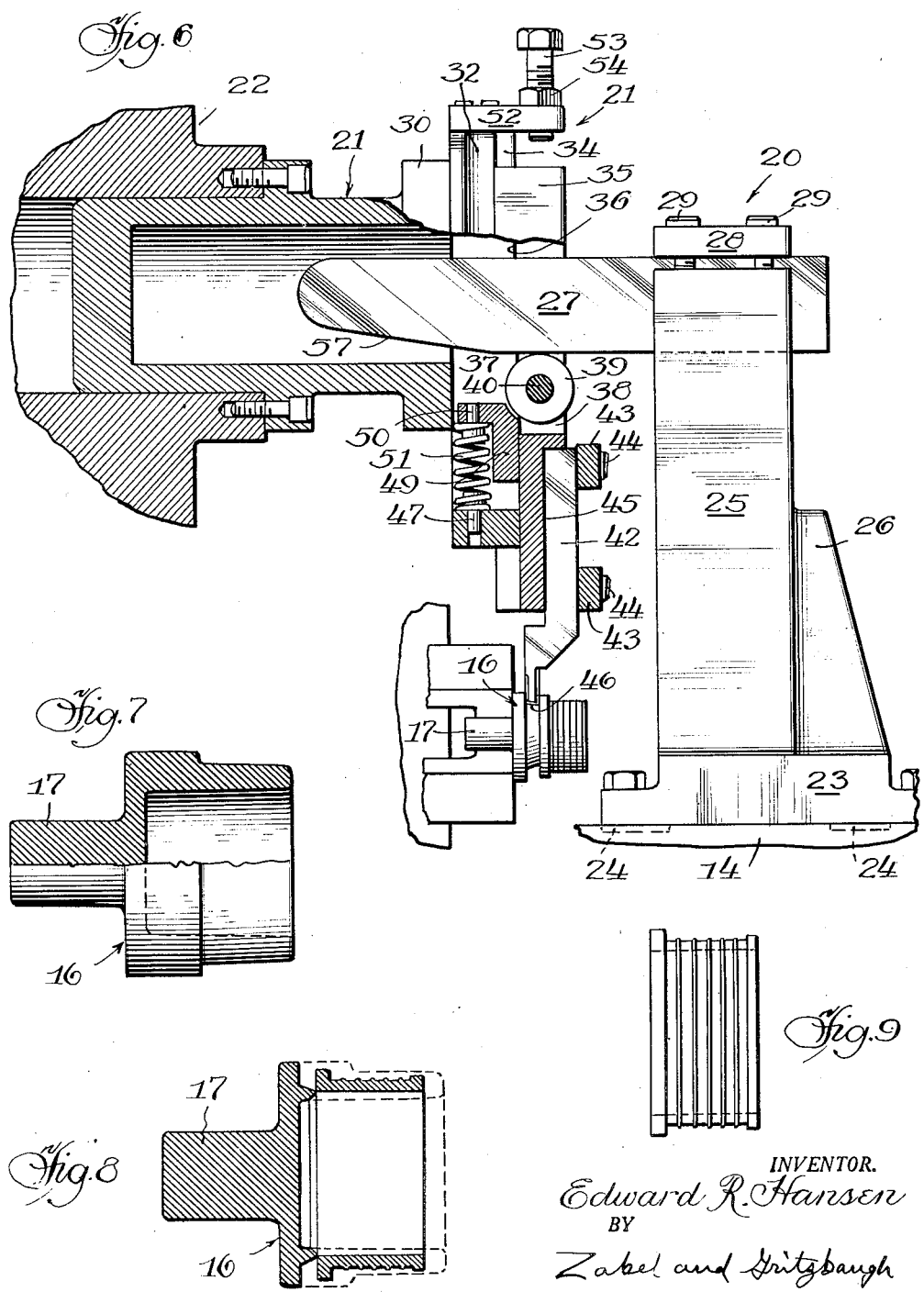

Patented Jan. 2, 1951

2,536,175

UNITED STATES PATENT OFFICE 2,536,175

CUTOFF ATTACHMENT FOR CHUCKING MACHINES

Edward R. Hansen, Racine, Wis., assignor to The Dumore Company, Racine, Wis., a corporation of Wisconsin Application October 3, 1946, Serial No. 701,019

2 Claims. (Cl. 29—57)

This invention relates to a cutoff attachment for chucking machines, and in particular, to an attachment mechanism which is actuated by the movement of the ram to move a cutting tool in a direction transverse to the motion of the ram for severing the finished work piece from the chucking piece.

A chucking machine usually provides a plurality of chucks which permit a plurality of pieces of work to be operated upon simultaneously. The chucks are commonly mounted on a spindle carrier, and the latter is rotated intermittently so that each piece of work is rotated successively into each one of a plurality of work stations. The ram or tool slide, may carry a tool for each work station, save one, the loading station.

The work is usually provided with an integrally formed chucking piece by means of which the work is gripped by a chuck. According to the usual practice, the chucking piece is severed from the finished work piece after removal of the work as a whole from the chuck. Thus, a separate operation is necessary.

Since the primary function of a chucking machine is to perform turning operations in which the tool moves axially with respect to the work, it is evident that additional means providing a cross feed is necessary to accomplish the operation of severing the chucking piece from the finished work piece. Although chucking machines are often provided with one or more forming arms which provide a cross feed, such forming arms are limited in number and their position with respect to a given station is fixed, due to the fact that they are mounted upon and actuated from within the head of the machine, as contrasted with the ram. That is, forming arms, due to the necessity of providing special actuating mechanism within the head of the machine for each forming arm, are relatively costly. Furthermore, the type of cross feed or transverse motion imparted thereto is not well adapted to the severing operation above referred to for it occurs at the beginning of each individual station cycle and is not designed to apply the force necessary to accomplish the severing operation.

It is an object of my invention to provide in combination with a chucking machine, means for serving the finished work piece from the chucking piece which is simple in operation and of inexpensive construction, and which is in the form of an attachment for optional use.

It is another object of my invention to provide a cutoff attachment which can be interchangeably mounted at any one of the work stations of a chucking machine.

It is a further object of my invention to provide a cutoff attachment in which the transverse or cross feed motion is provided by the relative motion of the ram and the head of the machine, thereby dispensing with the necessity of providing special actuating means in the head of the chucking machine.

Still another object is to provide a cross feed attachment for a chucking machine which develops sufficient force to drive a cutting tool in a transverse direction as to be of utility in severing the finished work piece from the chucking piece.

With reference now to the drawings, in which like reference numerals designate like parts, Fig. 1 is an elevation of a chucking machine embodying the cutoff attachment which forms my invention;

Fig. 3 is a perspective view of the cutoff attachment which comprises my invention;

Fig. 4 is an elevation partly in section of the cutoff attachment shown in Fig. 3;

Fig. 5 is a plan view of the cutoff attachment shown in Fig. 4;

Fig. 6 is a view similar to Fig. 4, but showing the parts in a changed position, and showing the relationship of the cutting tool to the work;

Fig. 7 is a view showing the work piece and chucking piece prior to the time that any machining operations have been performed on it;

Fig. 8 is a view showing the work piece and chucking piece just before severance from each other by the cutoff attachment; and Fig. 9 illustrates the finished work.

Figure 1:
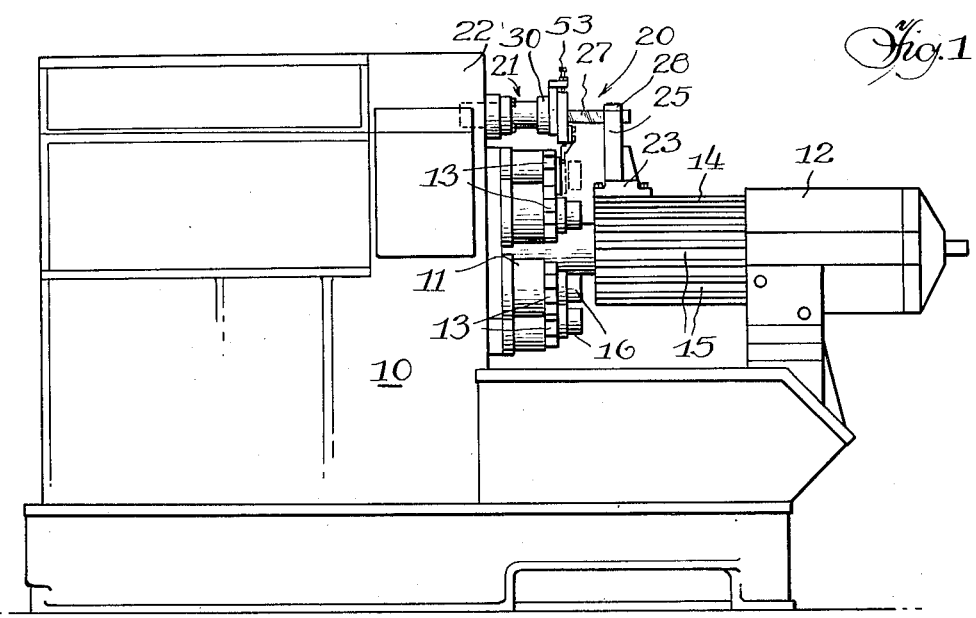

With reference now to Figs. 1 and 3, the reference numeral 10 indicates a chucking machine generally. It is provided with a spindle carrier 11 which is rotatably mounted on a ram stem 12. A series of chucks 13 are carried by the spindle carrier 11, the chucks being mounted on spindles which are not shown herein, to the end that the chucks may be driven by the spindles.

A ram 14 is slidably mounted on ram stem 12, and is generally of polygonal cross section, one side being provided for each chuck. In the chucking machine herein shown, there are six chucks 13, and the ram is hexagonal. Tools may be mounted on the various faces of the ram by means of grooves 15.

In operation, six stations are provided of which the first station is a loading station. One or more tools may be provided at each of the other stations for performing a machining operation upon a piece of work, which is mounted in one of the chucks, and successively advanced from one station to the other. By providing a plurality of chucks, a plurality of machining operations may be carried on simultaneously, as is well understood in this art. In the particularly type of chucking machine disclosed herein the ram 14 which carries the various tools is advanced toward the chucks so that the tools may be advanced axially with respect to the work.

Figs. 7 to 9, inclusive, show an example of the type of work that can be machined in a chucking machine, the work piece being designated by the reference numeral 16, and a chucking piece 17 being integrally formed with the work piece in order that the same may be held by the chucks 13.

The cutoff attachment comprises two assemblies, one being the cam attachment indicated generally by the reference numeral 20 which is mounted on the ram 14, and the other being the slide attachment indicated generally by the reference numeral 21, which is suitably mounted on the head portion 22 of the chucking machine 10. The cam attachment 20 comprises a base plate 23 provided with locating keys 24 by means of which it may be secured to one of the faces of the ram 14, in this instance, the top face which corresponds to the sixth station. Suitably secured to the base plate 23 is a cam post 25 and a post brace 26. The drift cam 27 may be set in a suitable groove formed in the upper portion of the cam post and secured in place by a clamp plate 28 and clamp screws 29.

The slide attachment 21 comprises a mounting post 30 which is in the form of a hollow cylindrical member suitably secured to a boss 31 on the head portion 22 of the chucking machine. The particular boss 31 is provided on the particular chucking machine shown in order to accommodate certain optional equipment, such as a forming arm. However, on machines not provided with an equivalent boss, the mounting post 30 can be suitably secured to the head portion by other means.

A slide base 32 is secured to the mounting post 30 by screws 58. The slide base is provided with a tongue 34 and a slide 35 having a corresponding groove 36 is slidably mounted on the tongue 34, as shown in Fig. 5. For the purpose of regulating the sliding engagement of the tongue and groove, a gib 55 is provided in the groove 36, and its position is regulated by one or more adjusting screws 56.

As shown in Fig. 4, an aperture 37 is provided in the slide base 32 and its integrally formed tongue 34, and a corresponding aperture 38 is provided in the slide 35. In the lower portion of the aperture 38 is disposed a cam roller 39 which is mounted on a pin 40, the pin being journaled in the slide 35.

In operation, it will be seen that when the ram is in its retracted position, the slide 35 will be urged upwardly by a spring 51, into inoperative position, as shown in Fig. 4. When the ram is advanced, the cam roller 39 will be engaged, and the slide 35 urged downwardly into its operative position, as shown in Fig. 6.

The lower portion of the slide 35 is provided with a groove 45 in which is disposed a tool 42. The tool is secured in the groove by clamp plates 43 and by clamping screws 44, which grip the shank of the tool, as shown in Fig. 3. The tool is provided with a cutting edge 46 which extends downwardly beneath the slide into the proximity of the work piece 16.

In the lower or connecting portion 48 of the slide base 32 is provided a screw or pin 47 which locates the lower end of the spring 51. The upper end of the spring is located by an oppositely disposed pin 50 which is carried by an L-shaped spring bracket 49, suitably secured to the slide 35. Thus, the spring is confined between the relatively moving parts and serves to urge the slide upwardly.

A bracket 52 is secured by screws 33 to the top surface of the slide base 32 and carries an adjusting screw 53 and a locking nut 54. The adjusting screw 53 limits the upward movement of the slide. Thus, when the drift cam 27 and the ram 14 are in their retracted position, the slide is maintained in such a position that the cam roller 39 may be readily engaged by the cam face 57 of the drift cam 27.

Figure 2:
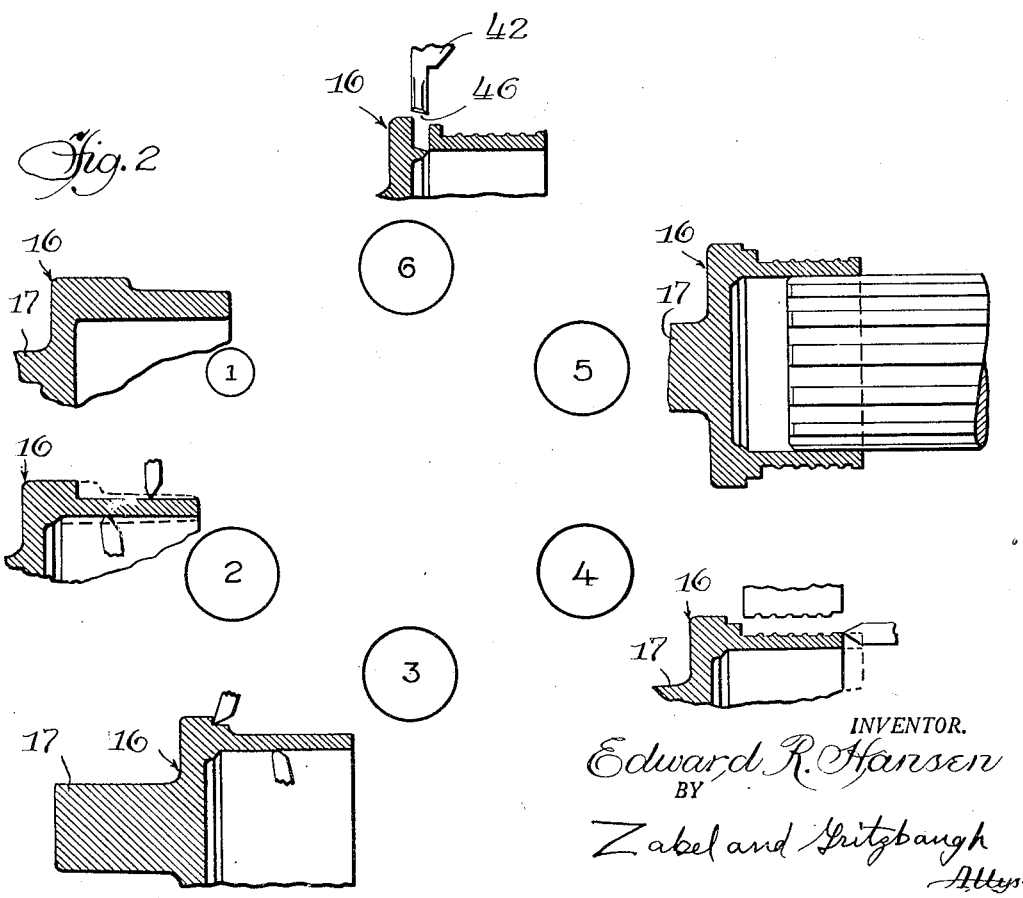
Fig. 2 is a diagrammatic representation of a complete cycle of operations as performed by the chucking machine shown in Fig. 1 on a piece of work.

As an example of the type of operation which may be performed by the attachment herein shown and described, Fig. 2 indicates the complete cycle of operations involved in the machining of a hose ferrule. The Arabic numerals represent the different stations in the chucking machine. The first station is the loading station, the second to fifth stations, inclusive, are various machining stations, and the sixth station is the cutoff station. The original casting, as shown in Fig. 7, comprises a work piece 16 and a chucking piece 17, by means of which the work piece may be held in one of the chucks 13. After the work piece has been turned down from its original dimensions, as indicated by the dotted lines in Fig. 8, to its finished dimensions, as shown by the solid line section, the finished work piece 16 must be severed from the chucking piece 17. This is accomplished by the cross feed motion imparted to the tool 42 by means of the cutoff attachment herein shown and described. More specifically, the drift cam 27, due to the small slope of its cam face 57, provides a comparatively slow and uniform rate of cross feed to the cutting tool, and one which is characterized by a much greater force than that provided by the usual forming arms.

I claim:

1. A cutoff attachment for an automatic chucking machine or the like, comprising a drift cam adapted to be detachably mounted on the ram of said chucking machine, a hollow mounting post adapted to be detachably mounted on the head of the chucking machine and adapted to receive said drift cam, a slide base secured to said mounting post and having an aperture aligned with said drift cam, a slide slidably mounted on said slide base and having an aperture aligned with said drift cam, a cam roller carried by said slide and disposed in said aperture for engagement by said drift cam, a spring positioned between the slide and slide base for urging said cam roller into engagement with said drift cam, adjustable stop means carried by the slide base to limit the displacement of said slide by said spring when said drift cam is retracted from engagement with said cam roller, and a cutoff tool mounted on said slide and having a cutting edge adapted to be aligned with a piece of work held in one of the rotating chucks of said chucking machine in order that the finished work piece may be severed from the chucking piece by the transverse motion of said cutoff tool as said slide is displaced by said drift cam.

2. A cut-off attachment for an automatic chucking machine or the like having a head portion providing a plurality of rotating chucks and having a sliding ram, comprising a drift cam, means detachably mounting said cam on said ram with said cam extending toward said head portion, a hollow mounting post detachably mounted on said head portion and providing a central opening for receiving said drift cam, a slide base secured to said mounting post, a slide mounted on said slide base, means providing a dove tail connection between said slide and said slide base to permit downward sliding movement of said slide in a radial direction with respect to one of said chucks, said slide base and said slide being in the form of rectangular plates having slot-shaped rectangular openings of a width sufficient to receive said drift cam, said openings registering with each other and with the opening in said hollow mounting post, a rotatably mounted roller disposed in the lower portion of the aperture in said slide and a locating pin projecting upwardly from the bottom wall of the aperture in said slide base, a bracket carried on said slide and projecting into the aperture in said slide base, a downwardly projecting locating pin carried by said bracket and aligned with said upwardly projecting locating pin, a helical spring disposed in the aperture in said slide base and maintained in position by said locating pins whereby said slide will be urged downwardly against the bias of said spring by the engagement of said roller by said drift cam as said drift cam is projected through said slide and slide base and into said hollow mounting post, and whereby said slide will be urged upwardly by said spring as said drift cam is retracted, adjustable means mounted on the top surface of said slide base and engaging the top surface of said slide to limit the upward movement of said slide after said drift cam has been retracted, said slide having means by which a cut-off tool can be secured thereto.

EDWARD R. HANSEN.

REFERENCES CITED

The following references are of record in the file of this patent:

UNITED STATES PATENTS

| Number | Name | Date |
|---|---|---|
| 624,802 | Henn | May 9, 1899 |
| 655,974 | Hakewessel et al. | Aug. 14, 1900 |
| 1,243,989 | Schulze | Oct. 23, 1917 |
| 1,677,131 | Cole et al. | July 17, 1928 |
| 1,947,800 | Ruffle | Feb. 20, 1934 |
| 2,033,490 | Simpson et al. | Mar. 10, 1936 |

FOREIGN PATENTS

| Number | Country | Date |
|---|---|---|
| 142,213 | Great Britain | Feb. 12, 1919 |